UNITED STATES PATENT OFFICE.

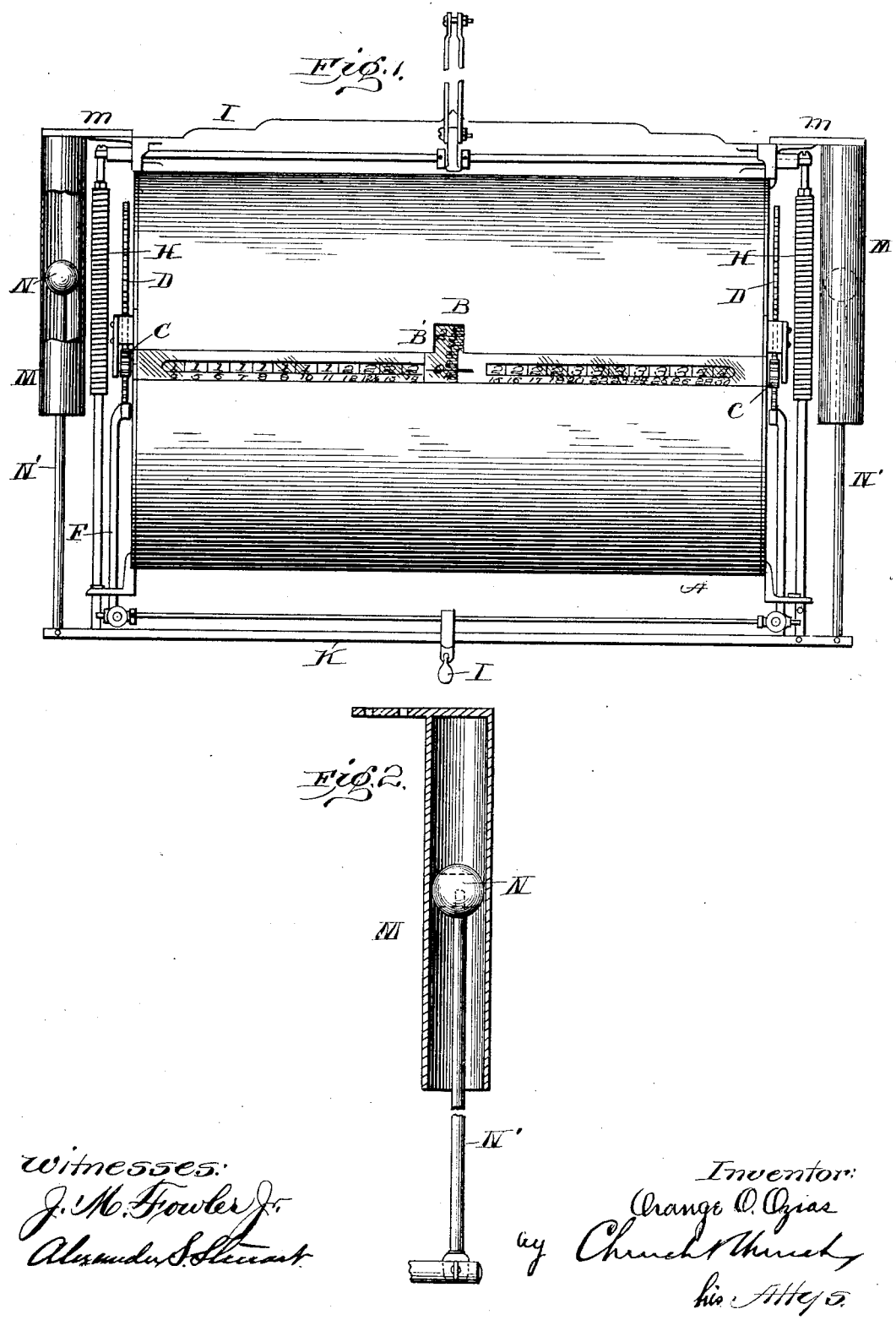

ORANGE O. OZIAS, OF DAYTON, OHIO.

SPRING-BALANCE SCALE.

SPECIFICATION forming part of Letters Patent No. 669,657, dated March 12, 1901.

Application filed December 19, 1900. Serial No. 40,435. (No model.)

*To all whom it may concern:*

Be it known that I, ORANGE O. OZIAS, a citizen of the United States, residing at Dayton, in the county of Montgomery, State of Ohio, have invented certain new and useful Improvements in Spring-Balance Scales; and I do hereby declare the following to be a full, clear, and exact description of the same, reference being had to the accompanying drawings, forming a part of this specification, and to the letters of reference marked thereon.

This invention relates to improvements in scales, being particularly applicable to scales wherein a spring or springs are employed to counterbalance the load, with a rotary indicator for indicating the weight or value of the load, one object of the invention being to provide an improved means whereby the indicator will be brought to rest quickly and without straining the working parts of the scale either when a load is suddenly applied or when a load is suddenly removed from the runner or load-support.

A further object of the invention is to provide a means for accomplishing the above-named object without in any wise affecting the final balance of the scale at any point.

Referring to the accompanying drawings, Figure 1 is a front elevation of a scale embodying my present improvements, portions being shown in section and with portions of the casing removed to show underlying parts. Fig. 2 is a detail section, on an enlarged scale, of one of the pneumatic cylinders with the plunger and its connections.

Like letters of reference in both figures indicate the same parts.

The scale illustrated in its working parts conforms generally to a well-known type of scale now on the market and embodies a rotary cylinder A, having upon its surface computations of value and weight which are indicated at a sight-opening B in the front of the casing B'. The cylinder A is mounted to rotate on a central spindle having pinions C at the ends, with which rack-bars D mesh, said rack-bars being in turn connected with a horizontal rod F, which constitutes a part of the runner or load-supporting device. To counterbalance the load and the supporting devices, as well as to return the cylinder to its initial position, counterbalancing-springs H are preferably located at each end of the cylinder and adjustably connected with the frame I at the top in such manner that the elasticity of the springs may be varied or they may be set at the zero-point or for other well-known purposes. The springs at their lower ends are connected by a horizontal bar K, centrally connected with the bar joining the rack-bars by means of the load-supporting hook L. These parts as thus assembled are adapted to form a hanging scale, and it is obvious that there is more or less side play in all directions of the runner or load-supporting devices, and to permit of this side play the connections between the parts are loose or pivotal connections, so as to prevent binding or friction.

Pneumatic dash-pot cylinders M, preferably of the inverted type or with their upper ends closed and lower ends open, are mounted at each end of the rotary cylinder, preferably by ears $m$, extending over and suitably connected with the frame, and working in these pneumatic dash-pot cylinders M are pistons N, rigidly connected with their piston-rods N', the latter extending down and connected with the outer ends of the runner or load-supporting devices, preferably by a loose or pivotal connection formed by a transverse pin, sufficient play being left to permit motion in any direction, as in the case of the other joints before referred to.

The connection between the piston and its rod being a rigid connection, it is obvious that provision must be made for permitting the lower end of the rod to swing transversely in any desired direction, and for this purpose the said piston is made spherical, as illustrated, and thus operates at all times as a piston regardless of the particular position of the lower end of the piston-rod. Obviously a piston of this character will not be absolutely tight, but will permit a certain quantity of air to pass around it from one side to the other, and in these scale constructions this is desirable, inasmuch as in the operation of the scales a momentary check is all that is necessary, and a limited vent must be provided, which in this construction takes place around the piston itself.

With a spherical piston it is obvious that the friction of the piston against the side walls of the dash-pot may be reduced to a minimum, and, furthermore, the pressure of the air tends to a certain extent to center the piston, and thus it is practically held out of contact with the walls of the dash-pot whenever an excess of pressure exists on one side of the piston.

Inasmuch as it is obvious that the play of the piston because of the movement of the lower end of its rod is relatively slight, it is also obvious that the piston may be less than a complete sphere or, in other words, its upper and lower segments may be removed; but care must be taken that its side walls are true spheres in order to accomplish the desired ends in the most perfect manner.

Obviously the invention is applicable to any of the ordinary or well-known types of spring-balance scales—such, for instance, as the well-known rotary hand or dial scales—and while I have not illustrated these well-known types of scales in connection with my invention it will be understood that I do not wish to be restricted to any particular type of scale.

Having thus described my invention, what I claim as new, and desire to secure by Letters Patent, is—

1. In a scale, the combination with a runner, springs for supporting said runner and an indicator connected with said runner whereby the weight or value of the load may be indicated, of a pneumatic dash-pot cylinder, a spherical piston located in said cylinder, a piston-rod rigidly connected with said piston and a loose connection between said piston-rod and runner; substantially as described.

2. In a scale of the spring-balance type in which the load-supporting runner is pendulously supported so as to swing freely to a limited extent in either direction, of a pneumatic dash-pot cylinder connected with the scale-frame, a spherical piston in said dash-pot cylinder, a piston-rod rigidly connected with said piston at one end and flexibly connected with the runner at the opposite end; substantially as described.

3. In a scale the combination with a rotary indicator, a spring-supported runner, racks connected with said runner and pinions connected with the indicator with which said racks engage, of pneumatic dash-pot cylinders located on opposite sides of the springs, spherical plungers mounted in the dash-pots, piston-rods rigidly connected with said plungers at one end and flexible connection with the runner at the opposite end; substantially as described.

ORANGE O. OZIAS.

Witnesses:
ALEXANDER S. STEUART,
ELIZABETH GRIFFITH.